3,733,256
PROCESS FOR EXTRACTING SILVER FROM
SILVER BEARING MATERIALS
Ralph Anderson, Saratoga, Calif., assignor to Future
Systems, Inc., Los Gatos, Calif.
No Drawing. Filed Oct. 12, 1970, Ser. No. 80,213
Int. Cl. C22d 1/12, 11/06
U.S. Cl. 204—109                              5 Claims

ABSTRACT OF THE DISCLOSURE

A process for extracting and recovering silver from the gelatin layer of photographic or other solid base materials including the steps of treating the material with an aqueous solution of oxidizing salt to oxidize the metallic silver in the gelatin layer of the material; washing the material with a complexing agent; solution to form silver thiosulfate ions and recovering the silver from the complexing agent solution.

BACKGROUND OF THE INVENTION

The present invention relates to the extracting recovery of silver from silver bearing materials. The invention has been found to be particularly useful in extracting and recovering silver from processed photographic base materials.

In normal photographic processing of black and white photographic film, approximately 80% of the silver is extracted as a soluble silver complex from the gelatin layer of the film by a fixer solution (hypo) during the film development process. The extracted silver may then be recovered in the most part from the fixer by any of various silver recovery methods, e.g. electrodeposition systems. The residual silver retained on the processed film is secured in the gelatin layers of the developed film as finely divided metallic silver. Economics make it desirable to extract that residual silver from the gelatin layer which was not extracted by the fixer solution. Previously, there have been various methods attempted to extract and recover the residual fine silver from processed photographic base materials. One method includes incineration of the material with subsequent recovery and purification of the silver from the residual ashes. A second approach includes removal of the gelatin layer and silver from the base material by strong caustic solutions followed by several steps of chemical digestion, separation and purification of the silver from the silver-gelatin-caustic solution mixture. A third approach includes mechanical removal of the gelatin and dispersed silver from the base material followed by chemical digestion, extraction and purification of the silver from the mixture.

The incineration method requires temperature control to prevent loss of the silver in the combustion gases and to prevent the tendency of the base material to melt into a "fuzed plastic ball" in the incinerator. This tends to reduce the efficiency of the incinerator and to increase air pollution. It further destroys the film base material which may otherwise be of value for future use. Though the other two approaches allow recovery of the film base material after stripping the silver, they require a relatively complex series of steps to reclaim the silver. Construction materials for the apparatus to carry out the steps are of concern as they necessarily need be capable of withstanding caustic solutions and incur substantial costs in reagent materials. Water pollution and air pollution are also of prime concern with these methods.

SUMMARY OF THE DISCLOSURE

The present invention teaches a method of for extraction and recovering silver from photographic base materials or other free silver containing materials. The method has proven to be economical, substantially free of pollutants and is free of obnoxious fumes and odors. The method further permits preservation of the base material if desired.

The present invention includes a chemical step of treating the gelatin layer of the film carrying the silver with an aqueous solution of oxidizing salt. As used herein oxidizing salt shall be defined to include those classes of compounds and elements which act as oxidizing agents in water and other solvents and do not depend upon the presence of hydrogen ions or hydronium ions to effect oxidation or acceptance of electrons. Upon contacting the gelatin layer, the oxidizing salt diffuses with the gelatin layer converts the residual metallic silver dispersed in the gelatin layer to a silver ion. The silver ion is precipitated to an insoluble halide of salt within the gelatin layer. The silver halide in the gelatin layer has a physical and chemical state similar to the original state before exposure and processing of the film. The gelatin layer is then washed with a complex agent solution in which the silver halide becomes soluble. The silver may then be recovered from the complex agent solution. In a specific case, after the film is treated with the oxidizing salt, it is washed by a complexing agent such as a fixer (hypo). In the wash step, the silver ion is extracted from the gelatin layer as a silver-thiosulfate complex in the fixer solution. The base material and gelatin is then removed from the complexing agent solution. The residual silver may then be recovered from the complex agent solution by means of a silver recovery system which may be in the form of electrodeposition equipment, replacement cartridges, precipitation or other means.

DESCRIPTION OF PREFERRED EMBODIMENTS

A preferred embodiment for the extracting and recovering of silver metal from a silver bearing material includes three primary steps. The first and second steps include means for extracting the silver from the silver bearing material. The first step includes treating the free silver containing material, e.g photographic film, with an aqueous solution of oxidizing salt to disperse within the gelatin layer oxidize the silver in the gelatin layer. As used herein, an oxidizing salt shall be defined as above. A desirable oxidizing salt has been found to take the form of ferric chloride in water solution. The oxidizing salt diffuses within the gelatin layer. After the film is treated by the oxidizing salt, e.g. the film is dipped into a solution of the salt, the film is washed with a thiosulfate fixer solution to dissolve the silver ion to form a silver complex and extract the silver complex from the gelatin layer. The silver-fixer solution is then processed through an electrolytic silver recovery system to recover the silver.

In incorporating the present process for extracting residual silver particles from photographic film, the photographic film comprises a base material with a gelatin layer super-imposed thereon. The gelatin layer in processed film includes dispersed free silver particles. The silver particles in the gelatin layer of the photographic film can be oxidized by an oxidant having a reduction potential equal to or greater than the standard oxidation potential of the silver under certain conditions. These conditions include that the free silver in the gelatin layer be finely divided, i.e. small particle size. This is the general state of the silver in photographic film and silver bearing photographic materials. Silver particle size in photographic the gelatin layer of film is frequently in the order of 0.1 microns to several microns. A second condition is that the conjugate moiety of the oxidizing agent, which is the chloride ions in ferric chloride generate or contribute an anion that forms an insoluble silver salt in the gelatin layer. The insoluble salt with an excess of conjugate moiety reduces the free silver ion content and the electromotive force. It also aids in rapidly precipitating the silver in the gelatin layer in situ. The oxidizing agent cations and anions are of sufficiently small diameter to enable ready diffusion into the gelatin layer to oxidize and precipitate the silver ion to an insoluble silver salt. If the atomic or molecular diameters of the reacting species are not sufficiently small to diffuse into the gelatin layer at a sufficient rate, a swelling agent need be added.

The theory of operation of the present invention is believed to be as follows. In oxidizing silver, the reduced species is the dispersed silver metal and the oxidized specie is the silver ion $Ag^+$.

In oxidizing silver with ferric chloride in water the following reaction occurs:

$$Fe^{+++} + 3Cl^- + Ag^° \xrightarrow{H_2O} Fe^{++} + AgCl_{(s)} + 2Cl^- \quad (1)$$

The reaction is composed of the sum of two single electrode potentials.

For the oxidation reaction of silver $$Ag^° \rightarrow Ag^+ + E \quad E^° = 0.798 \text{ volt at } 30^° \text{ C.} \quad (2)$$

For the reduction reaction of ferric ion $$Fe^{+++} + E \rightarrow Fe^{++} \quad E^° = 0.77 \text{ at } 30^° \text{ C.} \quad (3)$$

For the precipitation of silver chloride the following reaction occurs $$Ag^+ + 3Cl^- \rightarrow AgCl_{(s)} + 2Cl^-$$

The silver ion concentration is controlled by the solubility product constant $$\left( Ks = 10^{-10} = \frac{[Ag^+][Cl^-]}{[AgCl]} \right) \quad (4)$$

Reactions 2, 3 and 4 are added to give reaction 1.
The equation that describes the overa reaction 1 is $$E = E_o - \frac{RI}{NF} \ln \left[ \frac{Products}{Reactants} \right]$$

where $E_o$ is the characteristic constant representing the oxidation potential when the concentration activity of the oxidized specie is equal to the concentration of the reduced species; R is the universal gas constant; T is absolute temperature; N is the number of electrons per atom in the oxidation-reduction step for silver in units; and F is Faraday's constant.

The condition that must be met is that E of the oxidation reaction of Equation 2 must be less than E for the reduction reaction of Equation 3.

The formation of the insoluble silver chloride shifts the $E_o$ of 0.779 for silver to 0.198 at 30° C. so that the ferric iron reduction reaction will occur and oxidize the silver.

Accordingly, direct oxidation of finely divided silver is achieved when the reduction potential of the oxidizing salt is equal to or greater than the oxidation potential of the silver if the oxidizing agent can diffuse to the surface of the dispersed silver in the gelatin layer. The diffusion rate is inversely proportional to the 0.6 power of molar volume of the diffusing oxidizing agent and proportional to the 0.5 power of the molecular weight, and proportional to the absolute temperature. Viscosity also has an effect and the temperature effect on viscosity tends to accentuate the temperature effect of diffusion. Therefore, it is further desirable to have an oxidizing salt wtih a small atomic radius and a large molecular weight to maximize the diffusion.

The gelatin layer of the film base is miscroscopically porous. The diameter of the pores is a relevant factor in controlling the rate of diffusion of the oxidizing agent to the dispersed metallic silver. Thus the degree of swelling necessary is also relevant. It is known that the isoelectric point of gelatin is within the pH range of 4–5. At lower pH values the gelatin takes an acidic character and the reverse is true at higher pH values. Also, strong acids (low pH) and strong bases (high pH) swell the gelatin thereby causing the gelatin to become tacky before removal from the film base. Accordingly, to realize a high rate of diffusion, an oxidant with a large electromotive force, a small atomic or molecular diameter in a neutral solution is preferable.

Numerous oxidizers, have been tested for effectiveness in the presence of chloride ion. Considering the aspects of costs, pollution problems, availability, corrosivity and ease of handling, ferric iron was found to be highly desirable. Ferric iron in the form of ferric chloride also supplies an excess of chloride ion without addition of acid as it is highly soluble in water.

A plurality of different tests have been conducted. Mixtures of $FeCl_3$ in water (pH~7) with different concentrations of HCl have been evaluated. The tests have shown that in the absence of any acid, the oxidation and precipitation residence time is less than the extraction time for silver removal with fixer. As HCl is added, though the oxidation time decreases, gelatin swelling tends to take place. There has been no visual evidence of swelling with a neutral solution. Further, several hours of contact of the film with $FeCl_3$ solution exhibited no indication of gelatin swelling or tackiness. Other oxidizing agents which have proven highly effective include ferric bromide, ferric oxylate and combinations thereof.

In evaluating various oxidizing salts applicable to the present invention, they may be defined as falling in three classes. Class 1 includes those oxidants that possess oxidation potentials greater than that of silver (−0.799). The oxidizing salt in conjunction with a moiety or associated species increases the oxidation potential difference removing the free silver ions in solution; for example cerium dioxide. The chemical reaction takes the form $$CeO_2 + Ag \xrightarrow{NaNO_3} Ce_2O_3 + AgNO_3$$

Also, mercuric acetate is a further example of class 1. The chemical reaction takes the form $$Hg(C_2H_3O_2)_2 + Ag \rightarrow Hg(C_2H_3O_2) + AgC_2H_3O_2.$$

Class 2 oxidants includes those that possess oxidation potentials less than that of silver but in the presence of its conjugate moiety or additional specie enables oxidation of the elemental silver and depletion of the free silver ion concentration in solution by complex formation or precipitation. The choice of the oxidant depends upon its reduction potential in combination with the solubility product constant of silver with the conjugate moiety or associated specie or with the stability constant of the complex that forms with silver ion and the conjugate moiety or specie and the concentration. Examples include ferric chloride, ferric bromide and ferric oxylate. The reactions of these respective oxidants take the form $$FeCl_3 + Ag \rightarrow FeCl + AgCl_{(s)};$$

$$FeBr_3 + Ag \rightarrow FeBr_2 + AgBr_{(s)};$$

and $$Fe(C_2O_4)_3 + 2Ag \rightarrow 2FeC_2O_4 + Ag_2C_2O_4.$$

Class 3 oxidants include those that have electrode potential normally greater than silver and require the presence of conjugate moiety or additional specie which would deplete the free silver ion concentration in solution by complex formations for more rapid rate of dissipation. Examples include chlorine. The reaction takes the form $$Cl_2 + 2Ag \xrightarrow{H_2O} 2AgCl$$

After the film is treated by the oxidizing salt, the film is washed and the silver halide is extracted from the gelatin and base material by fixer (hypo) in a wash bath to form the silver thiosulfate complex. The wash bath may include waste fixer from photographic processors or unused fixer. Waste fixer which has been exhausted and rejuvenated several times has proven to be effective as a wash as well as unused fixer. Several variations of equipment may be utilized to wash the film in the wash bath. This may include a transfer system to accommodate sheet and roll film, or a system in which the film is first shredded or chopped and treated in a batch-type system, or a continuous system to handle shredded or chopped film. After the film is washed with the fixer to remove the silver halide from the film base material and gelatin, the fixer is processed through a silver recovery unit to recover the silver. For example, the silver recovery unit may be in the form of that disclosed in U.S. patent application Ser. No. 79,827 entitled Improved Electrodeposition Apparatus by Ralph Anderson and Rodney B. Beyer and assigned to the assignee of the present invention.

There are numerous advantageous aspects of the present process for recovery of silver from free silver containing materials. The process lends itself to use of electrolytic silver recovery equipment in the overall process. Waste fixer (hypo) from photographic processors may be used to extract the silver halide from the film. Exhausted fixer which though ineffective for photographic processing has been found effective in extracting silver halide from the emulsion. The materials utilized in the process are economical, no noticeable obnoxious fumes of gases are generated in the process and the process lends itself to preserving the base material for further use if desired.

I claim:

1. A process for extracting residual silver particles dispersed in a solidified gelatin layer material super-imposed on a solidified base material of photographic film, the process comprising the steps of:

first treating the gelatin layer of the silver bearing material with a solution consisting essentially of an oxidizing salt in water to oxidize metallic silver particles dispersed within the gelatin layer to a silver ion and to precipitate the silver ion to an insoluble silver halide and/or silver oxalate in the gelatin layer, said oxidizing salt being selected from the group consisting of ferric chloride, ferric bromide, ferric oxylate or combinations thereof; and then washing the material and gelatin with a thiosulfate fixer solution to extract the silver halide and/or silver oxalate from the gelatin layer material to form a silver thiosulfate complex within said solution.

2. The process of claim 1 including the further step after said washing step of processing the thiosulfate fixer solution through an electro-deposition recovery unit to electrodeposit the silver metal from the solution.

3. The process of claim 1 in which the oxidizing salt is ferric chloride.

4. The process of claim 1 in which the oxidizing salt is ferric bromide.

5. The process of claim 1 in which the oxidizing salt is ferric oxylate.

References Cited

UNITED STATES PATENTS

| 1,582,847 | 4/1926 | MacDonald | 75—118 |
| 3,594,157 | 7/1971 | Hendrickson et al. | 75—118 |
| 1,234,391 | 7/1917 | Renwick | 75—118 |

FOREIGN PATENTS

| 22,895 | 2/1918 | Denmark | 75—118 |

JOHN H. MACK, Primary Examiner

R. L. ANDREWS, Asistant Examiner

U.S. Cl. X.R.
75—118; 204—111